US012413913B2

(12) United States Patent
Statom et al.

(10) Patent No.: US 12,413,913 B2
(45) Date of Patent: Sep. 9, 2025

(54) METHOD AND SYSTEM FOR TRANSDUCER VALIDATION

(71) Applicant: Neptune Technology Group Inc., Tallassee, AL (US)

(72) Inventors: Drew Statom, Sheffield, AL (US); Mahesh Matam, Cumming, GA (US)

(73) Assignee: Neptune Technology Group LLC, Tallassee, AL (US)

( * ) Notice: Subject to any disclaimer, the term of this patent is extended or adjusted under 35 U.S.C. 154(b) by 320 days.

(21) Appl. No.: 17/813,500

(22) Filed: Jul. 19, 2022

(65) Prior Publication Data

US 2023/0036761 A1 Feb. 2, 2023

Related U.S. Application Data

(60) Provisional application No. 63/227,457, filed on Jul. 30, 2021.

(51) Int. Cl.
*H04R 17/00* (2006.01)
*G01F 1/66* (2022.01)
(Continued)

(52) U.S. Cl.
CPC ........... *H04R 17/005* (2013.01); *G01F 1/662* (2013.01); *G01F 1/667* (2013.01); *G01H 3/005* (2013.01);
(Continued)

(58) Field of Classification Search
CPC ....... H04R 17/005; G01F 1/662; G01F 1/667; G01N 29/30; G01N 2291/106; G01H 3/005; G01H 13/00; G01S 7/5205
(Continued)

(56) References Cited

U.S. PATENT DOCUMENTS 3,146,141 A * 8/1964 Woodland ......... B29C 66/73921
228/1.1
3,391,571 A * 7/1968 Johanson ................. G01H 1/00
310/368

(Continued)

FOREIGN PATENT DOCUMENTS

CN 103436685 A * 12/2013
CN 103595295 A * 2/2014
(Continued)

OTHER PUBLICATIONS

Diederik Van Nuffel et al., Calibration of Dynamic Piezoelectric Force Transducers Using the Hopkinson Bar Technique, 15th International Conference on Experimental Mechanics, Porto/Portugal, Jul. 22-27, 2012, pg(s) 13 (Year: 2012).*

(Continued)

*Primary Examiner* — Stephanie E Bloss
*Assistant Examiner* — Kevin C Butler
(74) *Attorney, Agent, or Firm* — Snyder, Clark, Lesch & Chung, LLP

(57) ABSTRACT

A device, a method, and a non-transitory storage medium are described in which a transducer validation service is provided. The service may include stimulating a piezoelectric transducer. The service may include measuring a signal output, which is responsive to the stimulus, from the piezoelectric transducer. The service may include evaluating the measured signal output to a reference voltage and determining whether the piezoelectric transducer is reverse-poled or not based on the evaluation. The service may further include determining a response to the determination when the piezoelectric transducer is reverse-poled.

21 Claims, 11 Drawing Sheets

(51) Int. Cl.
*G01F 1/667* (2022.01)
*G01H 3/00* (2006.01)
*G01H 13/00* (2006.01)
*G01N 29/30* (2006.01)
*G01S 7/52* (2006.01)

(52) U.S. Cl.
CPC ............ *G01H 13/00* (2013.01); *G01N 29/30* (2013.01); *G01N 2291/106* (2013.01); *G01S 7/5205* (2013.01)

(58) Field of Classification Search
USPC .......................................................... 73/1.82
See application file for complete search history.

(56) References Cited

U.S. PATENT DOCUMENTS

| | | | | | |
|---|---|---|---|---|---|
| 3,586,888 | A | * | 6/1971 | Dorfman | F23Q 3/002 335/205 |
| 3,648,279 | A | * | 3/1972 | Watson | H03K 17/967 310/366 |
| 3,792,467 | A | * | 2/1974 | Sauveur | H03K 17/964 310/339 |
| 3,942,381 | A | * | 3/1976 | Brown | G01L 11/04 73/703 |
| 3,955,409 | A | * | 5/1976 | Moser | G01N 3/32 73/847 |
| 3,963,966 | A | * | 6/1976 | Mohr | F23Q 3/002 102/210 |
| 4,015,152 | A | * | 3/1977 | Mohr | F23Q 3/002 310/339 |
| 4,485,324 | A | * | 11/1984 | Berlincourt | H02N 2/183 310/339 |
| 4,744,423 | A | * | 5/1988 | Chia-Hsi | B25D 11/00 173/90 |
| 4,975,616 | A | * | 12/1990 | Park | H03K 17/9643 310/366 |
| 5,048,320 | A | * | 9/1991 | Mitsuhashi | G01M 7/08 73/12.09 |
| 5,286,199 | A | * | 2/1994 | Kipke | H02N 2/043 434/114 |
| 5,325,339 | A | * | 6/1994 | Yost | G01N 29/30 367/13 |
| 5,345,514 | A | * | 9/1994 | Mahdavieh | B82Y 15/00 382/152 |
| 5,431,054 | A | * | 7/1995 | Reeves | G01N 29/043 73/612 |
| 5,686,675 | A | * | 11/1997 | Barton | G01B 17/02 73/866.5 |
| 6,327,921 | B1 | * | 12/2001 | Hsu | G01N 29/0645 73/866.5 |
| 7,345,407 | B2 | * | 3/2008 | Tanner | H02N 2/188 310/339 |
| 7,780,597 | B2 | * | 8/2010 | Panda | G01S 15/8909 310/318 |
| 8,159,900 | B2 | * | 4/2012 | Moore | G01S 7/52052 367/13 |
| 8,164,976 | B2 | * | 4/2012 | Moore | G01S 7/52052 367/13 |
| 10,168,301 | B2 | * | 1/2019 | Böhm | G01N 29/043 |
| 2009/0093999 | A1 | * | 4/2009 | Kearns | G01N 29/4481 702/184 |
| 2009/0303064 | A1 | * | 12/2009 | LaBreck | G01N 29/07 340/678 |
| 2011/0032799 | A1 | * | 2/2011 | Moore | G01S 7/52052 367/95 |
| 2016/0091466 | A1 | * | 3/2016 | Ginther | G01M 99/008 73/1.82 |
| 2016/0131746 | A1 | * | 5/2016 | Beaty | G01S 15/8915 367/13 |
| 2016/0209371 | A1 | * | 7/2016 | Böhm | G01N 29/069 |
| 2019/0064014 | A1 | * | 2/2019 | Sun | G01N 29/4472 |
| 2019/0242858 | A1 | * | 8/2019 | Yamamoto | G01N 29/4463 |
| 2021/0364471 | A1 | * | 11/2021 | Vrana | G01N 29/043 |
| 2022/0079566 | A1 | * | 3/2022 | Makita | G16H 40/40 |
| 2022/0397500 | A1 | * | 12/2022 | Kim | G01N 29/4472 |
| 2023/0036761 | A1 | * | 2/2023 | Statom | G01F 1/662 |

FOREIGN PATENT DOCUMENTS

| | | | | | |
|---|---|---|---|---|---|
| CN | 104807890 | A | * | 7/2015 | |
| CN | 204594938 | U | * | 8/2015 | |
| CN | 106198759 | A | * | 12/2016 | |
| CN | 106770669 | A | * | 5/2017 | |
| CN | 206876643 | U | * | 1/2018 | |
| CN | 112462353 | A | * | 3/2021 | ......... G01S 7/52004 |
| DE | 102013211616 | A1 | * | 12/2014 | ......... G01N 29/043 |
| EP | 3524974 | A1 | * | 8/2019 | ............. G01H 5/00 |
| IT | 1150483 | B | * | 12/1986 | ................ B41J 5/08 |
| JP | 5166724 | B2 | * | 3/2013 | ......... G01N 29/0618 |
| JP | 2019082460 | A | * | 5/2019 | |
| KR | 20200095642 | A | * | 8/2020 | ............. G01M 7/08 |
| TW | 1782026 | B | * | 8/2019 | ............. A61C 19/04 |
| TW | I782026 | B | * | 8/2019 | ............. A61C 19/04 |
| WO | WO-2019119309 | A1 | * | 6/2019 | |

OTHER PUBLICATIONS

Lianghui Ding et al., Modeling and Evaluation of Piezoelectric Transducer (PZT)-Based Through-Metal Energy and Data Transfer, Sensors 2020, 20, 3304; doi:10.3390/s20113304, p. 16 (Year: 2020).*

Jongseon Johnson et al., An impedance measurement system for piezoelectric array element transducers, Measurement 97 (2017) 138-144 (Year: 2017).*

B. Yan et al., Measurement of Strain and Polarization in Piezoelectric and Electrostrictive Actuators, Smart Materials and Structures, Oct. 10-11, 2002, Montreal, Quebec, Canada, p. 7 (Year: 2002).*

J.J. Peters et al., A prototype tap test imaging system: Initial field test results, https://doi.org/10.1063/1.1291323, AIP Conf. Proc. 509, 2053-2060 (2000) (Year: 2000).*

Adams RD et al., Citation: Low-Velocity Impact Inspection of Bonded Structures, Structural Adhesives in Engineering, Bristol; UK; Jul. 2-4, 1986, 1986, p. 139-142 (Year: 1986).*

Adams, R D et al., Citation: Review of progress in quantitative nondestructive evaluation. Volume 5B—Proceedings of the Twelfth Annual Review, Williamsburg, VA; Jun. 23-28, 1985, 1985, p. 1253-1258 (Year: 1985).*

Diederik Van Nuffel et al., Calibration of Dynamic Piezoelectric Force Transducers Using the Hopkinson Bar Technique, 15th International Conference on Experimental Mechanics, Porto/Portugal, Jul. 22-27, 2012, p. 13 (Year: 2012).*

Stewart Sherrit et al., Characterization of Piezoelectric Materials for Transducers, Jet Propulsion Laboratory, California Institute of Technology, Pasadena, California, USA, Nov. 2007, p. 45 (Year: 2007).*

J.-H. Tong et al., Fabrication of a Piezoelectric Impact Hammer and Its Application to the In-situ Nondestructive Evaluation of Concrete, Jpn. J. Appl. Phys. vol. 41 (2002) pp. 6595-6600 (Year: 2002).*

Tuğrul Öztürk et al, A contribution to the dynamics of the tapping process: analytically estimated and measured instantaneous eigenfrequencies of the tapping tool, Production Engineering (2023) 17:613-624 https://doi.org/10.1007/s11740-022-01158-3, p. 12 (Year: 2023).*

Yinghua Hu et al., Push-Pull Inverter Using Amplitude Control and Frequency Tracking for Piezoelectric Transducers, Micromachines 2023, 14, 2147. https://doi.org/10.3390/mi14122147, p. 18 (Year: 2023).*

Prof. DSc. DževadHadžihafizović et al, Introduction to Nondestructive Testing NDT, University of Sarajevo 2024, p. 245 (Year: 2024).*

Robert G. Bryant, Overview of NASA Langley's Piezoelectric Ceramic Packaging Technology and Applications, NASA Langley Research Center, Hampton VA, 2007, p. 8 (Year: 2007).*

Steve Carter et al, Selecting Piezoresistive vs. Piezoelectric Pressure Transducers, Kulite Semiconductor Products, Inc.-Industry/ Kulite GeneralOverview , 2018, pp. 1-25 (Year: 2018).*

(56) References Cited

OTHER PUBLICATIONS

Lianghui Ding et al., Modeling and Evaluation of Piezoelectric Transducer (PZT)-Based Through-Metal Energy and Data Transfer, Sensors 2020, 20, 3304; doi:10.3390/s20113304, pp. 16 (Year: 2020).*

J.W. Waanders, Piezoelectric Ceramics: Properties and Applications, Philips Components, 1991, 91 pages (Year: 1991).*

João C. S. Queiroz et al., Damage Detection in Composite Materials Using Tap Test Technique and Neural Networks, Journal of Nondestructive Evaluation (Feb. 22, 2021) 40:27 https://doi.org/10.1007/s10921-021-00759-9, p. 9 (Year: 2021).*

* cited by examiner

METHOD AND SYSTEM FOR TRANSDUCER VALIDATION

CROSS-REFERENCE TO RELATED APPLICATION

The present application claims priority to U.S. Provisional Patent Application No. 63/227,457 filed on Jul. 30, 2021, the entirety of which is hereby incorporated by reference herein.

BACKGROUND

Utility companies and other entities operate distribution systems for various resources (e.g., water, gas, electricity, chemicals, etc.) to deliver these resources to customers connected to the distribution systems. A meter may be used at each point the resource is removed and/or provided from the distribution system to a customer to measure usage. For flow metering, the meter may include transducers.

DETAILED DESCRIPTION OF PREFERRED EMBODIMENTS

Figure 1:
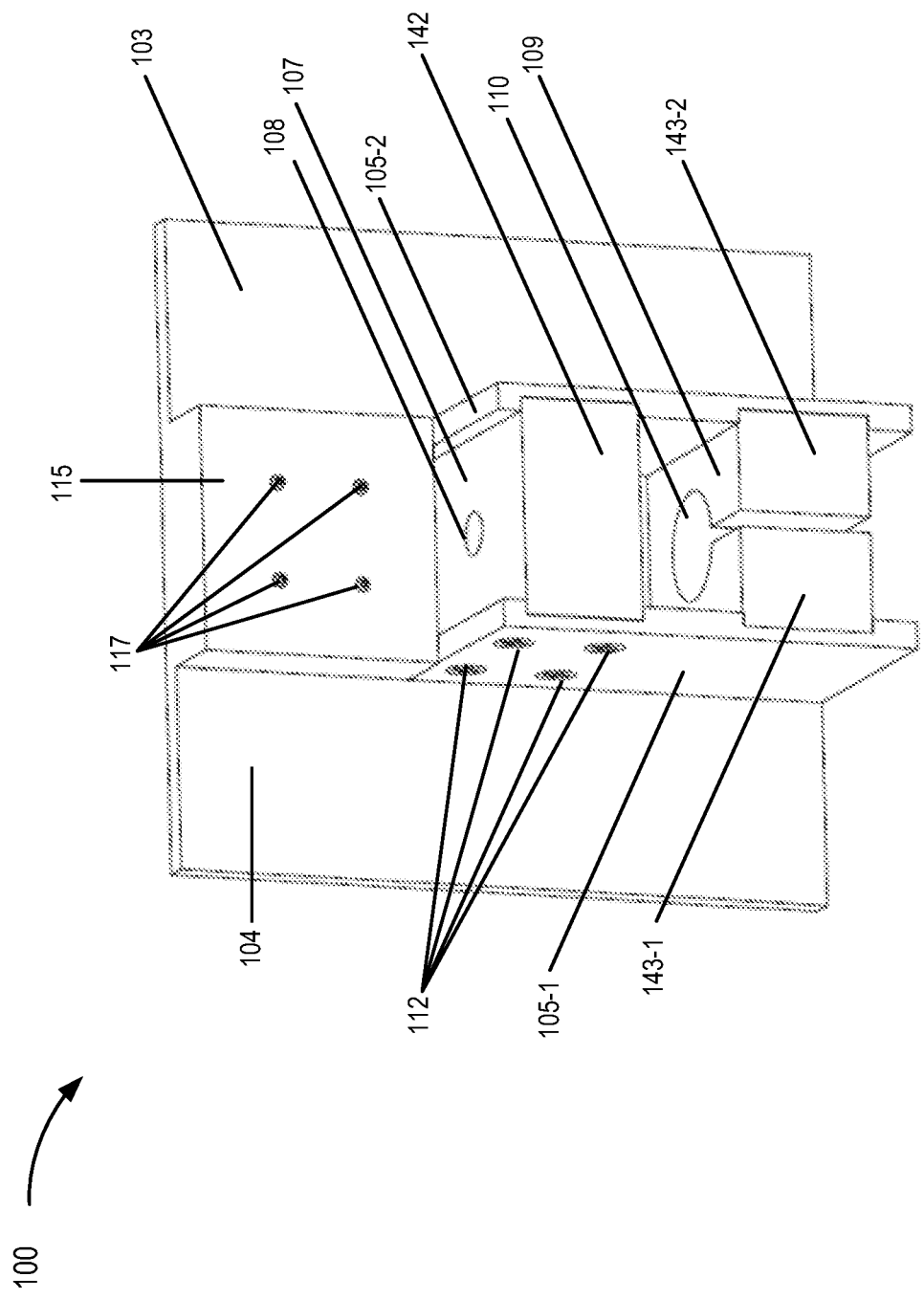
FIG. 1 is a diagram illustrating a view of an exemplary apparatus in which an exemplary embodiment of transducer validation may be implemented.

The following detailed description refers to the accompanying drawings. The same reference numbers in different drawings may identify the same or similar elements. Also, the following detailed description does not limit the invention.

Checking the polarity of piezoelectric transducers is an important aspect of qualifying transducers for further use in flow metering. For example, two transducers that have opposite polarity when used in a meter, such as a flow meter, may produce artifacts that will affect a flow measurement and its accuracy. A reverse poled transducer may produce a lower pulse width ratio relative to a correctly poled transducer. Additionally, a reverse poled transducer may suffer from low pulse width ratio. Transducers that are differently poled may produce waveforms that are out of phase with each other (e.g., 180 degrees out of phase).

To avoid using an incorrectly configured transducer, a test may be performed on the transducer. For example, a non-destructive method for testing the transducer may involve the use of x-ray. However, this approach can be problematic because of the gray-scale image and inability to pinpoint the different colored wires that connect to the electrodes. Further, x-ray analysis is not able to determine transducer poling issues (e.g., reversed poled). Alternatively, there are destructive methods for testing, such as cutting open the transducer. Manufacturers or other types of entities may discard transducers that have reverse polarity issues even when using non-destructive methods.

According to exemplary embodiments, an apparatus and method for testing transducers is described. According to an exemplary embodiment, the test may check for oppositely poled transducers. According to an exemplary embodiment, the test may check for reverse-connected wires. According to an exemplary embodiment, the test may be applied to a piezoelectric transducer.

According to an exemplary embodiment, the apparatus may include a frame. The frame may be configured to support a first piece and a second piece. According to an exemplary embodiment, the first piece may be positioned above the second piece. According to an exemplary embodiment, the first piece may be fixed to the frame and the second piece may be removable from the frame. According to an exemplary embodiment, the second piece may be configured to receive a transducer under test. The first piece may include an aperture configured to allow a striker to pass through the aperture and hit a portion of a transducer under test. The second piece may be configured to expose the portion of the transducer and allow the striker to hit the transducer under test. Based on the hitting of the transducer, the transducer may produce a charge. The induced charge or voltage may be measured and evaluated. Based on the result of the measurement and evaluation, a reverse poled transducer and/or oppositely connected wires of the transducer may be detected in a non-destructive manner. Additionally, as described herein, a piezoelectric transducer that may have a polarity issue may not be discarded. For example, as described herein, the logic of a water meter or another type of device may be modified in a manner that accounts for the polarity issue.

FIG. 1 is a diagram of an exemplary apparatus that provides an exemplary embodiment of transducer validation, as described herein. According to various exemplary embodiments, apparatus 100 or portions thereof may be made of metal (e.g., stainless steel, aluminum, tungsten, or the like), plastic (e.g., heavy plastic, polycarbonate (PC), or the like), or another type of material or composite that may have a suitable density, rigidity, and/or other desired properties of relevance.

As illustrated, apparatus 100 may include a frame 103. Frame 103 may include a base panel 104 and panels 105-1 and 105-2 (also referred to collectively as panels 105 and individually or generally as panel 105). Panels 105 may extend substantially perpendicular from base panel 104. Panels 105 may be substantially parallel to each other. According to various exemplary embodiments, base panel 104 and panels 105 may or may not be a unitary piece or structure. Panels 105 may provide stability for frame 103. Panels 105 may be configured to receive a guide piece 107 and a transducer holder 109. Panels 105 may also support guide piece 107 and transducer holder 109, as described herein. According to an exemplary embodiment, guide piece 107 may be affixed to panels 105. For example, guide piece 107 may be affixed to panels 105 using fasteners 112, such as screws, bolts, or another type of element that may attach guide piece 107 to panels 105. The number and placement of fasteners 112 are exemplary. Although not illustrated, according to an exemplary embodiment, transducer holder 109 may be affixed to panels 105 in a similar manner. According to other exemplary embodiments, guide piece 107 may be affixed to panels 105 and transducer holder 109 may not be affixed to panels 105, as described herein.

Guide piece 107 may align and guide a striker (not illustrated) to hit a transducer (also not illustrated) that is positioned in transducer holder 109. For example, guide piece 107 may include a passthrough hole 108 that allows the striker to hit the transducer seated in transducer holder 109 via guide piece 107, as described herein. For example, a center point of passthrough hole 108 may be vertically aligned with a center point of a passthrough hole 110 formed in a body of transducer holder 109. According to some exemplary embodiments, passthrough hole 108 and passthrough hole 110 may be concentric in which the diameter of passthrough hole 108 may be smaller than a first bore of passthrough hole 110, as described herein. Guide piece 107 also may include a face plate 142, which is described further below. Additionally, for example, transducer holder 109 may include passthrough hole 110 that is configured to receive and secure the transducer under test, as described herein. Transducer holder 109 may also include face plates 143-1 and 143-2 (also referred to collectively as face plates 143 and individually or generally as face plate 143), which is described further below.

As further illustrated, according to some exemplary embodiments, apparatus 100 may include a mounting piece 115. Mounting piece 115 may be affixed to frame 103 using fasteners 117. The number and placement of fasteners 117 are exemplary. According to other exemplary embodiments, frame 103 and mounting piece 115 may be a unitary piece. Mounting piece 115 may be configured to mount a mechanism that automates management of various aspects of the striker during a test, such as positioning and releasing the striker, which causes the striker to hit the transducer under test via guide piece 107 and retrieving the striker for a subsequent test, as described herein. According to other exemplary embodiments, mounting piece 115 may be omitted. For example, an operator of apparatus may manage various aspects of the striker to allow transducers to be tested according to an exemplary embodiment of transducer validation, as described herein. As an example, a human may position and release the striker via passthrough hole 108 and retrieve the striker after the transducer under test has been hit. This process may be repeated.

Understandably, however, human intervention in relation to this aspect of testing the transducer (and perhaps other aspects of a validation test) may not yield optimal results given various factors relating to repeatability (e.g., height and/or position of striker relative to the transducer under test upon release, steadiness of striker upon release, etc.), throughput (e.g., the number of tests performed over time), and/or other types of metrics of relevance. According to still other exemplary embodiments, the mechanism may be freestanding and not attached to apparatus 100, in which case mounting piece 115 may be omitted.

Although FIG. 1 illustrates and describes an exemplary embodiment of apparatus 100, according to other exemplary embodiments, apparatus 100 may include additional, different, and/or fewer elements. For example, guide piece 107 and the striker may be omitted. By way of further example, the transducer under test may be stimulated by way of other types of mechanisms and/or methods, such as use of an ultrasonic pulse, a pressure pulse, or another manner that provides a suitable excitation that would cause the piezoelectric transducer to produce a signal, which may be measured and analyzed, to determine whether the transducer is correctly poled or not, as described herein.

Figure 2A:
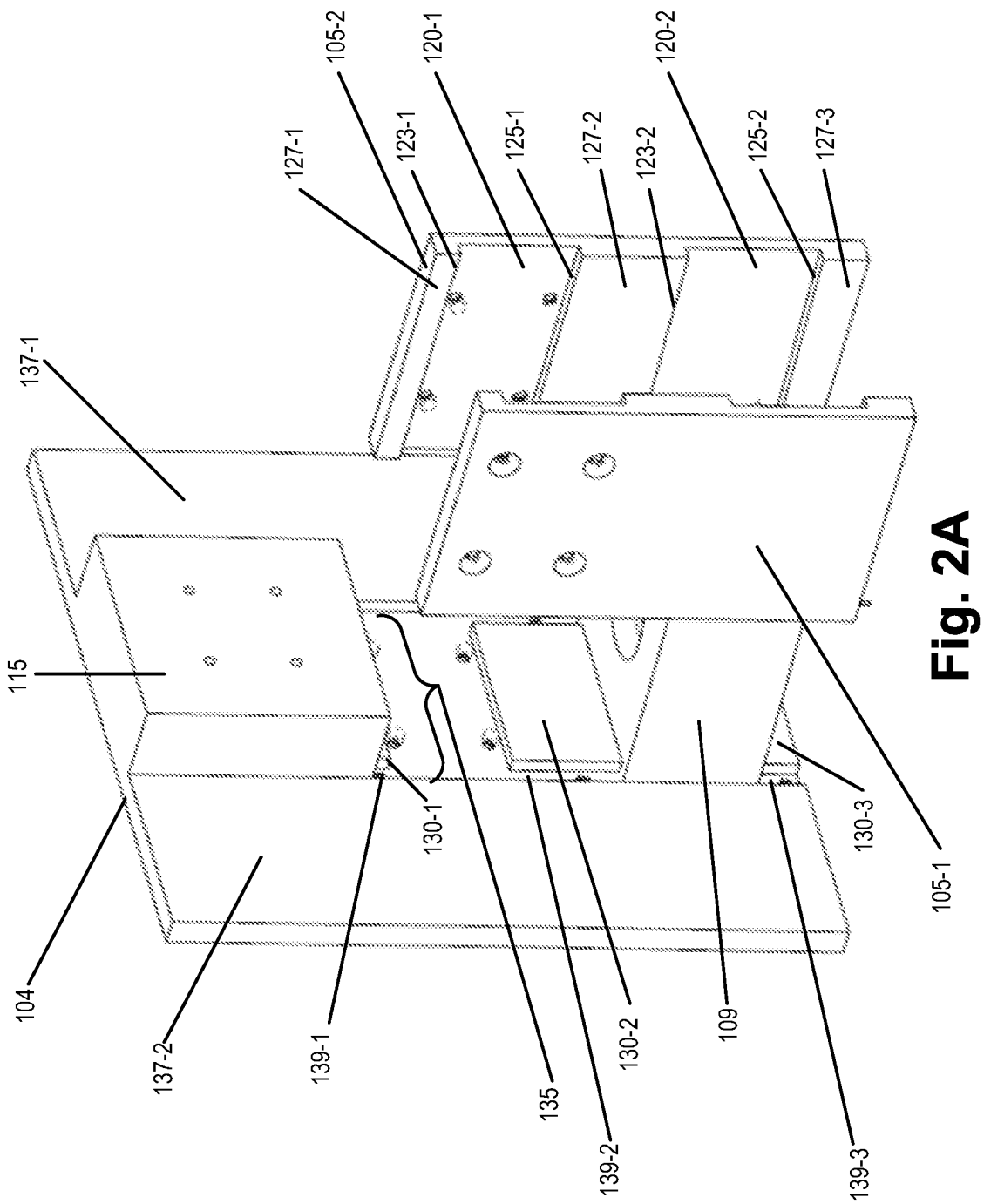
FIG. 2A is a diagram illustrating another view of a portion of an exemplary apparatus in which an exemplary embodiment of transducer validation may be implemented.
Figure 2B:
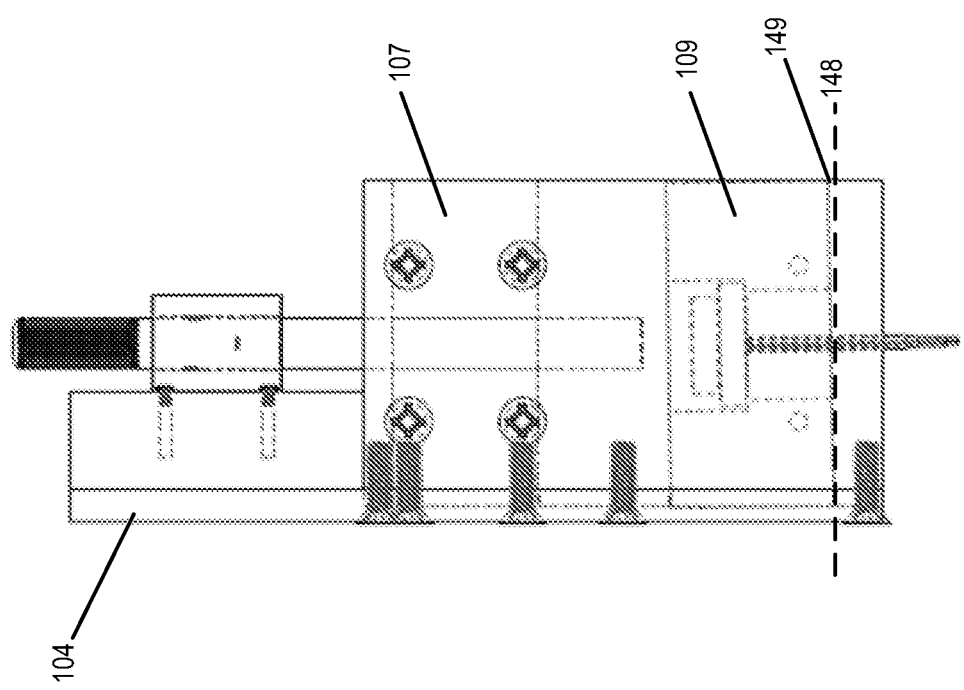
FIG. 2B is a diagram illustrating yet another view of a portion of an exemplary apparatus in which an exemplary embodiment of transducer validation may be implemented.

FIG. 2A is a diagram illustrating another view of a portion of apparatus 100. As illustrated, according to an exemplary embodiment, panel 105 may include a track 120-1 and a track 120-2 (also referred to collectively as tracks 120 and individually or generally as track 120). For example, track 120-1 may be configured to receive guide piece 107 (not illustrated in FIG. 2A) and tracking 120-2 may be configured to receive transducer holder 109. According to this example, each track 120 may have a squared-C configuration. For example, track 120-1 may define the squared-C configuration based on an upper lip 123-1 and a lower lip 125-1, and track 120-2 may define the squared-C configuration based on an upper lip 123-2 and a lower lip 125-2. For description purposes, upper lips 123-1 and 123-2 may be referred to collectively as upper lips 123 and individually or generally as upper lip 123, and similar nomenclature for lower lips 125 or individually or generally as lower lip 125. As such, upper lips 123 and lower lips 125 of each panel 105 may stabilize and secure guide piece 107 and transducer holder 109 when inserted in tracks 120. For example, respective portions (e.g., cooperating surfaces) of top and bottom surfaces of guide piece 107 and transducer holder 109 may be in supportive contact with upper lips 123 and lower lips 125. According to other examples, tracks 120 may be of a shape and/or a dimension different from the squared-C configuration, as described herein. According to some exemplary embodiments, tracks 120 may position guide piece 107 and transducer holder 109 parallel to each other. According to other exemplary embodiments, tracks 120 may not run parallel to each other. For example, referring to FIG. 2B, transducer holder 109 may be slightly angled towards base panel 104. For example, line 148 may indicate a position for the bottom or second side of transducer holder 109 if it were parallel to guide piece 107. Here, an angle 149 is illustrated. For example, the range for angle 149 may be about less than 2 degrees but not 0 degrees or substantially 0 degrees. Higher angles (e.g., above this range) may prevent sufficient transfer of stimulus to the piezoelectric material of the transducer.

Referring back to FIG. 2A, as further illustrated between tracks 120, panel 105 may include spacing portions 127-1, 127-2, and 127-3 (also referred to collectively as spacing portions 127 and individually or generally as spacing portion 127). Spacing portions 127-1 and 127-2 may contribute to a distance that the striker travels to hit the transducer under test with sufficient force to induce a charge or voltage for measurement and analysis, as described herein. Spacing portion 127-2 may afford sufficient space between a bottom surface of guide piece 107 and a top or first surface of transducer holder 109 to allow transducers to be received and removed or swapped in and out for testing. According to various exemplary implementations, transducers may be received and removed or swapped in and out for testing by a human or use of a device. According to another approach, referring to FIG. 1, transducer holder 109 may be slid away from frame 103 (e.g., base panel 104) along track 120-2 and allow a user or a device to place the transducer in and remove the transducer from transducer holder 109. Spacing portion 127-3 may provide space for connection of the transducer to other devices, as described herein. For example, a wire of the transducer, which may extend from a bottom or second side of the transducer, may be connected to an oscilloscope or an evaluator device that enables determining whether the transducer under test is valid or not. For example, an invalid transducer may be a reverse poled transducer and/or has oppositely connected wires, and a valid transducer may be not reverse-poled and/or not have oppositely connected wires. For purposes of description, "reversed-poled" may mean where a positive wire is not connected to a positive-poled face of a piezoelectric component or a positive poled face of a piezoelectric component is not connected to a positive wire, for example.

According to some exemplary embodiments, apparatus 100 may include spacers 130-1, 130-2, and 130-3 (also referred to collectively as spacers 130 and individually or generally as spacer 130). Spacer 130 may be affixed to frame 103, or spacer 130 may be a unitary element with frame 103. Spacer 130-1 may have a vertical dimension that is substantially the same as spacing portion 127-1. Additionally, spacer 130-2 may have a vertical dimension that is substantially the same as spacing portion 127-2 and spacer 130-3 may have a vertical dimension that is substantially the same as spacing portion 127-3. Spacers 130 may also provide support for guide piece 107 and transducer holder 109 in a corresponding manner as upper lips 123 and lower lips 125.

According to some exemplary embodiments, frame 103 may include a recess 135 at which spacers 130 may be affixed or positioned. As illustrated, recess 135 may be adjacent to panels 137-1 and 137-2 (also referred to collectively as panels 137 and individually or generally as panel 137) of frame 103. Spacers 130 may be substantially flush with panels 137. Additionally, as illustrated, gaps 139-1, 139-2, and 139-3 (also referred to collectively as gaps 139 and individually or generally as gaps 139) may be configured between ends of spacers 130 and panels 137-1 and 139-2. Gaps 139 may have widths that accommodate spacers 127 of panels 105. As such, referring to FIGS. 1 and 2, spacers 130 and spacers 127 of panels 105 may form a squared-C configuration, which may be perpendicular to the squared-C configuration of tracks 120 of panels 105. Additionally, face plate 142 and face plates 143 may rest on panels 105, which may help stabilize guide piece 107 and transducer holder 109, as well as ensure that guide piece 107 and transducer holder 109 are properly seated relative to frame 103, tracks 120, spacers 130, and so forth.

Figure 3:
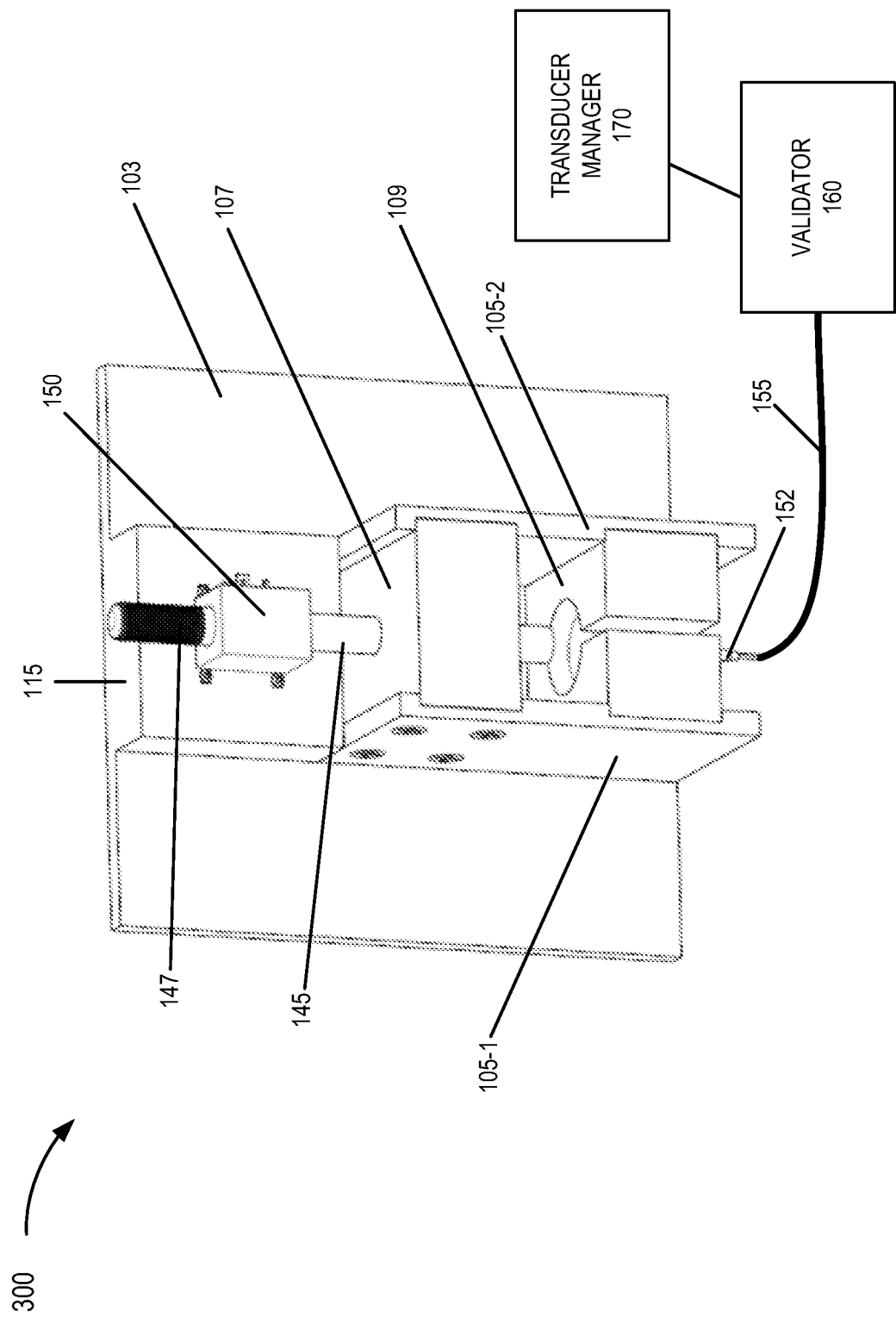
FIG. 3 is a diagram illustrating a view of an exemplary apparatus in which an exemplary embodiment of transducer validation may be implemented.

FIG. 3 is a diagram illustrating an exemplary embodiment of a system 300. For example, in addition to what has been previously illustrated and described, FIG. 3 shows a striker 145, a controller 150, a connector 155, a validator 160, and a transducer manager 170. A wire 152 of a transducer is also illustrated, for purposes of description relating to system 300. According to various exemplary embodiments, system 300 may include additional, different, and/or fewer elements. For example, an element (e.g., controller 150, validator 160, and/or transducer manager 170) that provides an automated step(s) of a validation process may be omitted. Additionally, or alternatively, one or multiple steps performed by the element may be omitted without omitting the element in its entirety.

As previously described, a striker, such as striker 145 may be used to hit the transducer under test to cause the transducer to produce a charge or voltage that may be measured and evaluated for purposes of validation. According to this example, striker 145 has a rod-like shape, but other configurations may be implemented. The material, weight, density, and other factors of relevance pertaining to striker 145 to provide sufficient force to produce the voltage/charge yet be non-destructive to the transducer is beyond the scope of this description. Optionally, striker 145 may include a handle portion 147. The handle portion 147 can have a knurl or a method of preventing a slip of striker 145 from a hand on to the transducer in a manual validation configuration.

Controller 150 may include a device that manages the operation of striker 145. Controller 150 may include a mechanism that holds striker 145 in a position for release and subsequent striking of the transducer in a fully automated validation operation. Controller 150 may also include a mechanism for retrieving and placing striker 145 back in the position for a next test. Controller 150 may include logic for automating this process. For example, controller 150 may include timers that may relate to the releasing and retrieving striker 145. Controller 150 may also be implemented to include a mechanism (e.g., magnetic, pneumatic, electro-magnetic, etc.) and/or other elements (e.g., a motor, a solenoid, etc.) to manage the operation of striker 145. In this way, controller 150 may automate the use of striker 145 in the testing process. According to some exemplary embodiments, validator 160 may be connected to controller 150. For example, validator 160 may control, communicate, trigger, and/or coordinate with controller 150 to provide an automation of a validation process, as described herein and further below. According to other exemplary embodiments, controller 150 may manage another type of device such as a commercial pulse generator, a signal generator, a pulse generator by a time-to-digital converter board in a flow meter, or another type of generator that may generate an impulse (e.g., an impulse voltage, an impulse force, etc.) that provides sufficient excitation of the piezoelectric transducer. The controller 150 may also instruct the next steps in an automated validation process.

Figure 5B:
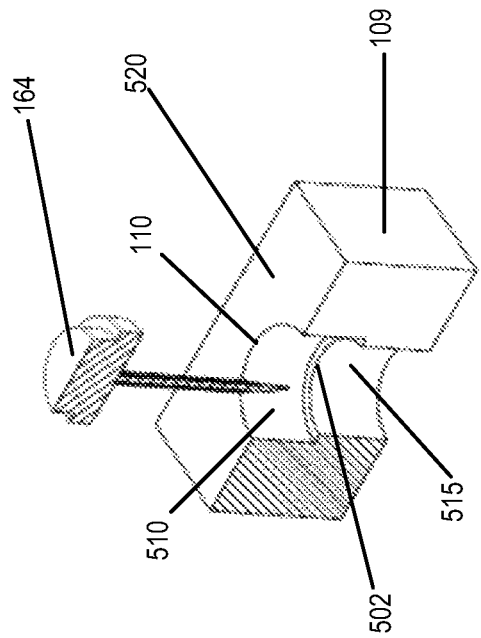
FIGS. 5A and 5B are diagrams illustrating views of exemplary embodiments of a transducer holder of an exemplary apparatus.
Figure 5A:
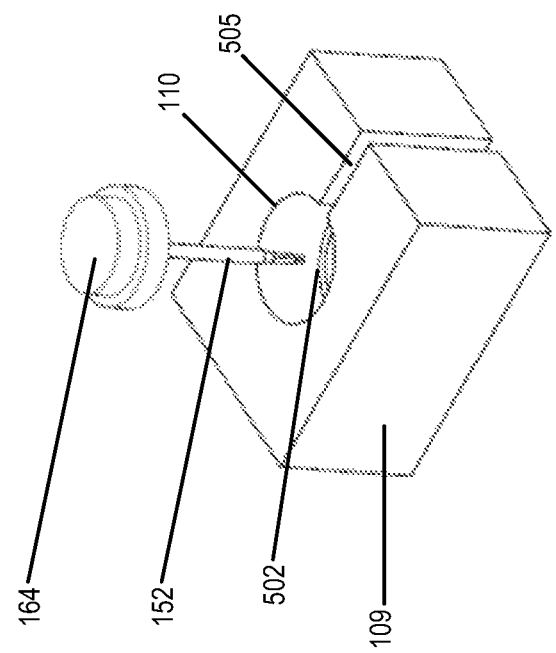

Wire 152 may be of a transducer 164, which is illustrated and described in FIGS. 5A and 5B. For example, wire 152 may be implemented as a cable having a sheath surrounding +Ve and −Ve wires. The cable 152 may be of a three wire or a two wire configuration. A correctly poled piezoelectric transducer 164 may have a +Ve wire (e.g., indicated by color) connected to the positive poled-PZT material and a −Ve wire (e.g., indicated by a different color) connected to the negative-poled PZT material.

Connector 155 may include a cable, wires, and/or include another type of interface that provides a connection between transducer 164 and validator 160. For example, connector 155 may include a suitable plug, alligator clip, wire connector, or another type of interface that accommodates an input to validator 160 from wire 152 of transducer 164. The cable 152 connector may be a three or two pin outlet with the sheath connected to the −Ve wire in the two pin configuration.

Validator 160 may include a device that performs a validation process. Validator 160 may include logic that measures the voltage, the signal, or the charge received via connector 155 from transducer 164. Validator 160 may convert the received input from analog to digital. Validator 160 may include analytics that evaluates the measured voltage, signal, or charge and determines whether the transducer is validated or not. According to exemplary embodiment, the analytics may identify the first peak or wave of the measured signal at a zero crossing. A signal of a transducer that has a positive peak at the zero crossing may be deemed validated and a signal that has a first negative peak or is out of phase (e.g., 180 degrees, etc.) at the zero crossing may be deemed not validated. Validator 160 may store and apply a reference voltage to the signal to determine the first peak relative to an envelope of the signal over time. For example, there may be a positive reference voltage and/or a negative reference voltage for determining first peaks of correctly poled and/or incorrectly poled transducers 164. According to some exemplary embodiments, validator 160 may be implemented as a computer that hosts software and/or other types of instructions, which when executed, is configured to perform the validation process or a portion thereof. According to some exemplary embodiments, validator 160 may include multiple devices, such as one device to measure the output of transducer 164 and another device to analyze or evaluate the measured output.

Although not illustrated, validator 160 may be connected to, control, and/or trigger an operation of controller 150. For example, the release of striker 145 and the retrieval of striker 145 (e.g., from transducer holder 109) may be based on communication with validator 160. By way of further example, after an output signal of transducer 164 is received by validator 160 or after the output signal of transducer 164 is analyzed, validator 160 may trigger or instruct controller 150 to retrieve striker 145 and transducer 164. Removal of transducer 164 and/or replacement of the tested transducer 164 with another transducer 164 to be tested may subsequently occur, such as by an operator or a device (not illustrated), as previously described. Controller 150 may communicate or signal validator 160 to indicate the tested transducer 164 has been removed or apparatus 100 and/or indicate a new transducer 164 to be tested has been received. According to various exemplary embodiments, controller 150 may position transducer 164 in transducer holder 109 with or without communication and/or coordination with validator 160. Controller 150 may communicate or signal to validator 160 that the new transducer 164 is in position (e.g., seated in transducer holder 109) and ready for testing. Validator 160 may acknowledge and/or govern when striker 145 is released for striking the new transducer 164 with controller 150.

Transducer manager 170 may include a device that manages receipt and removal of transducer 164. For example, transducer manager 170 may be implemented as a robotic arm device. Transducer manager 170 may include logic that places transducer 164 in transducer holder 109 and retrieves transducer 164. According to some exemplary embodiments, the execution of placement and retrieval, by transducer manager 170, may be coordinated with controller 150 and/or validator 160. As illustrated in FIG. 3, for example, transducer manager 170 may be communicatively coupled to validator 160. Although not illustrated, other connections may be implemented between controller 150, validator 160, and/or transducer manager 170 that may support various messages of communication pertaining to a validation process or step of the validation process.

According to some exemplary embodiments, transducer manager 170 may also connect and/or disconnect wire 152 of transducer 164 to/from connector 155, replace the transducer 164 with the next transducer once the test is complete from transducer holder 109 either by removing transducer holder 109 from panels 105 (e.g., via tracks 120) or by replacing transducer 164 without removing transducer holder from panels 105. In case of the controller 150 failure, striker 145 can be set in position to drop from a predetermined height using transducer manager 170. For example, the robotic arm may perform these tasks. According to other exemplary embodiments, these tasks may be performed, in whole or in part, by a person.

Figure 4A:
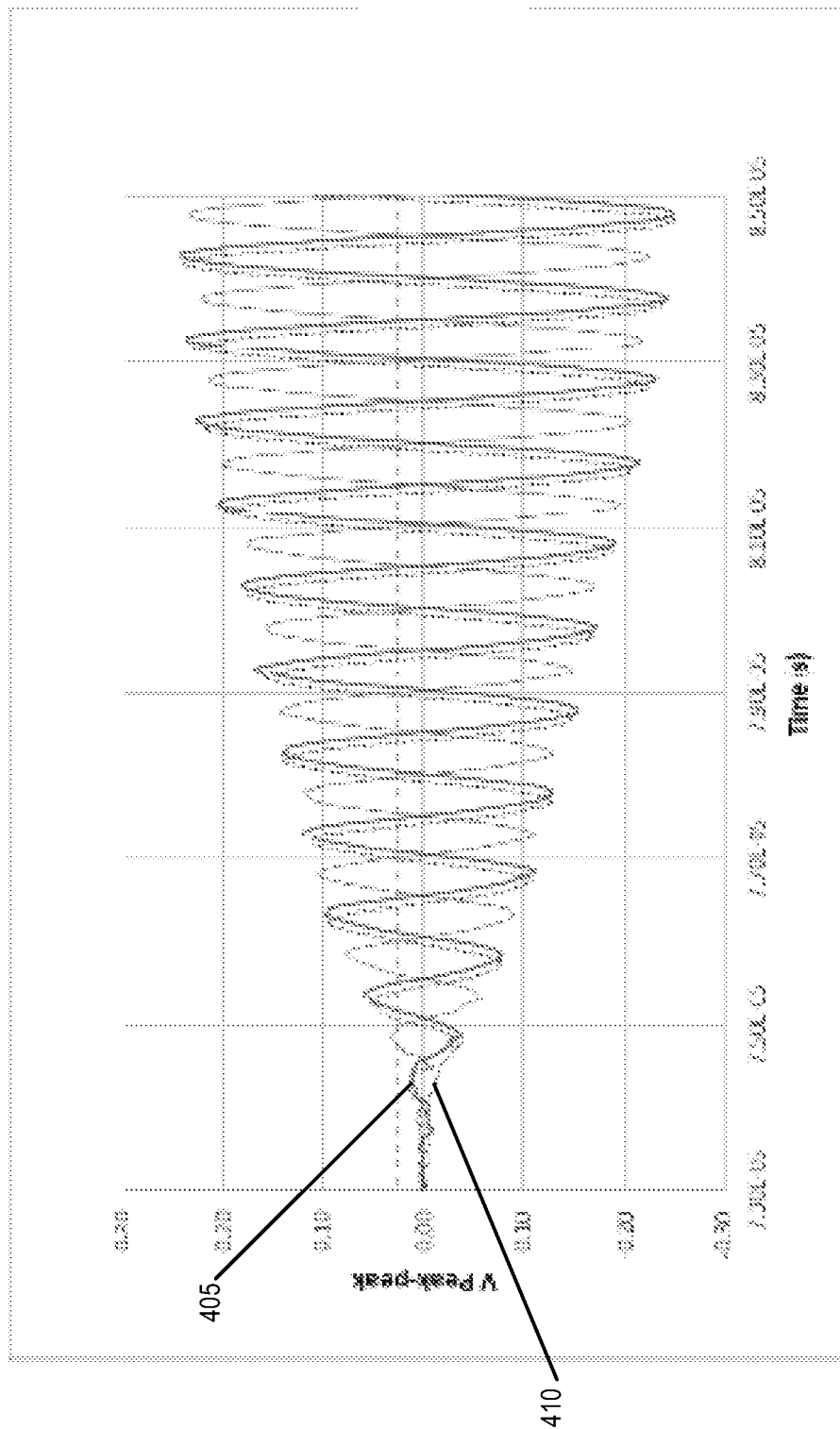
FIG. 4A is a diagram illustrating exemplary signals caused by excitation of a transducer.

FIG. 4A is a diagram that illustrates exemplary signals and their first peak characteristics, recorded in a flow meter as described herein. In a flow meter, assuming the transmitting transducer is correctly connected/poled, the receive transducer can be validated. For example, first peak 405 of a signal associated with one transducer 164 may be indicative that transducer 164 is validated whereas first peak 410 of another signal associated with another transducer 164 may be indicative that the other transducer 164 is not validated (e.g., reverse-poled PZT of the transducer or its wires are oppositely connected). According to an exemplary embodiment, validator 160 may store and apply a reference voltage for analyzing a signal and determining a first peak, as described herein.

Figure 4B:
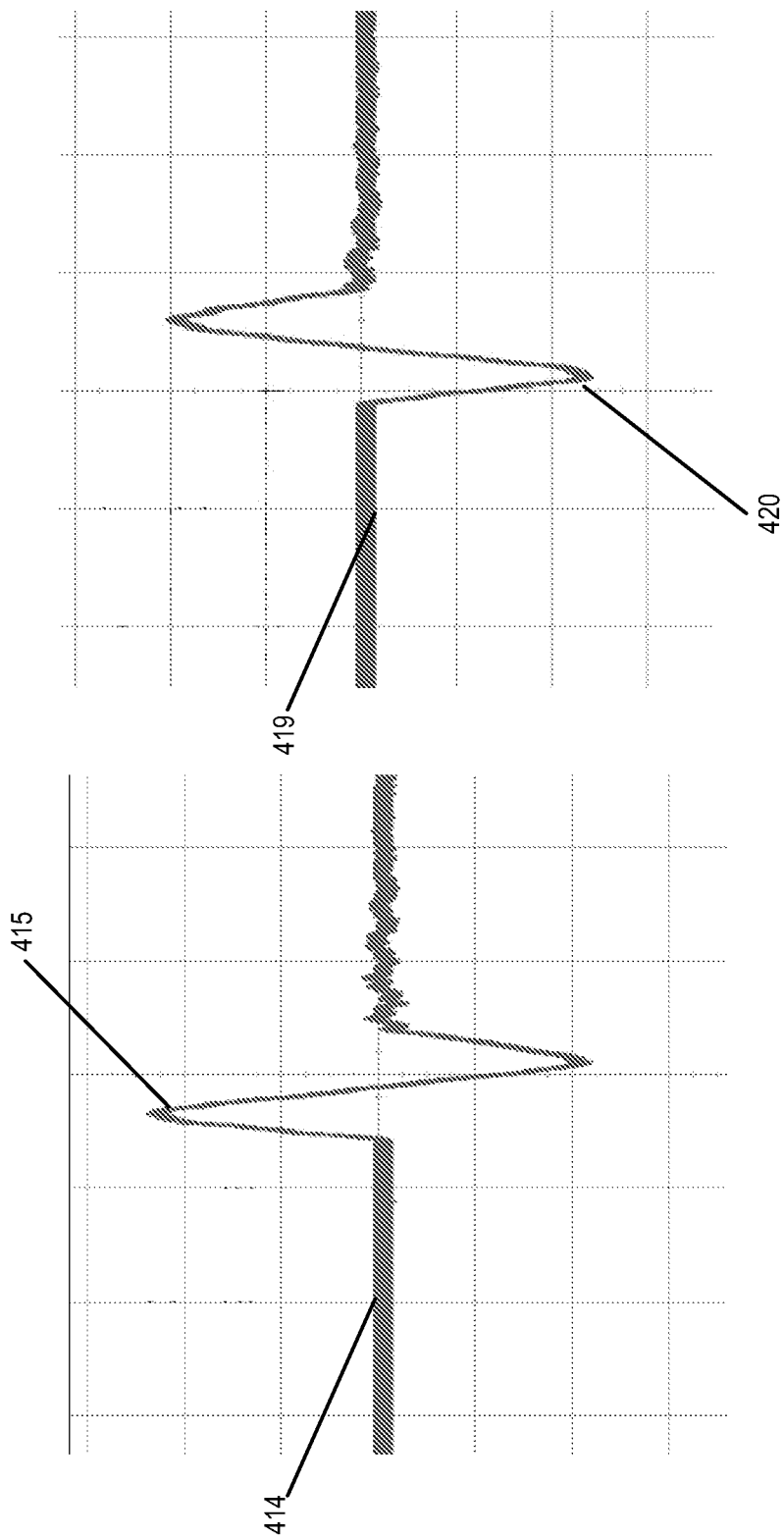
FIG. 4B is another diagram illustrating exemplary signals caused by excitation of a transducer.

FIG. 4B is another diagram illustrating exemplary signals and their first peak characteristics based on a mechanical force used to excite a piezoelectric transducer 164. As illustrated, a first peak 415 of a first signal 414 may be indicative that transducer 164 is validated whereas a first peak 420 of a second signal 419 may be indicative that the other transducer 164 is not validated (e.g., reverse-poled PZT of the transducer or its wires are oppositely connected).

As previously described, according to other embodiments, the validation process may be performed, at least in part, by a human. For example, an oscilloscope may be connected to transducer 164, and the output voltage, signal, or charge may be received and displayed to a user. Based on the signature of the received input and a reference voltage, the user may determine whether transducer 164 is validated or not (e.g., correctly poled or not).

According to an exemplary embodiment, transducer 164 is a piezoelectric transducer. For example, the piezoelectric may be implemented with various materials, such as $Pb(Zr-Ti)O_3$, $PbTiO_3$, $BaTiO_3$, $Bi_4Ti_3O_{12}$ $LiTiO_3$, or another suitable piezoelectric material.

Figure 6:
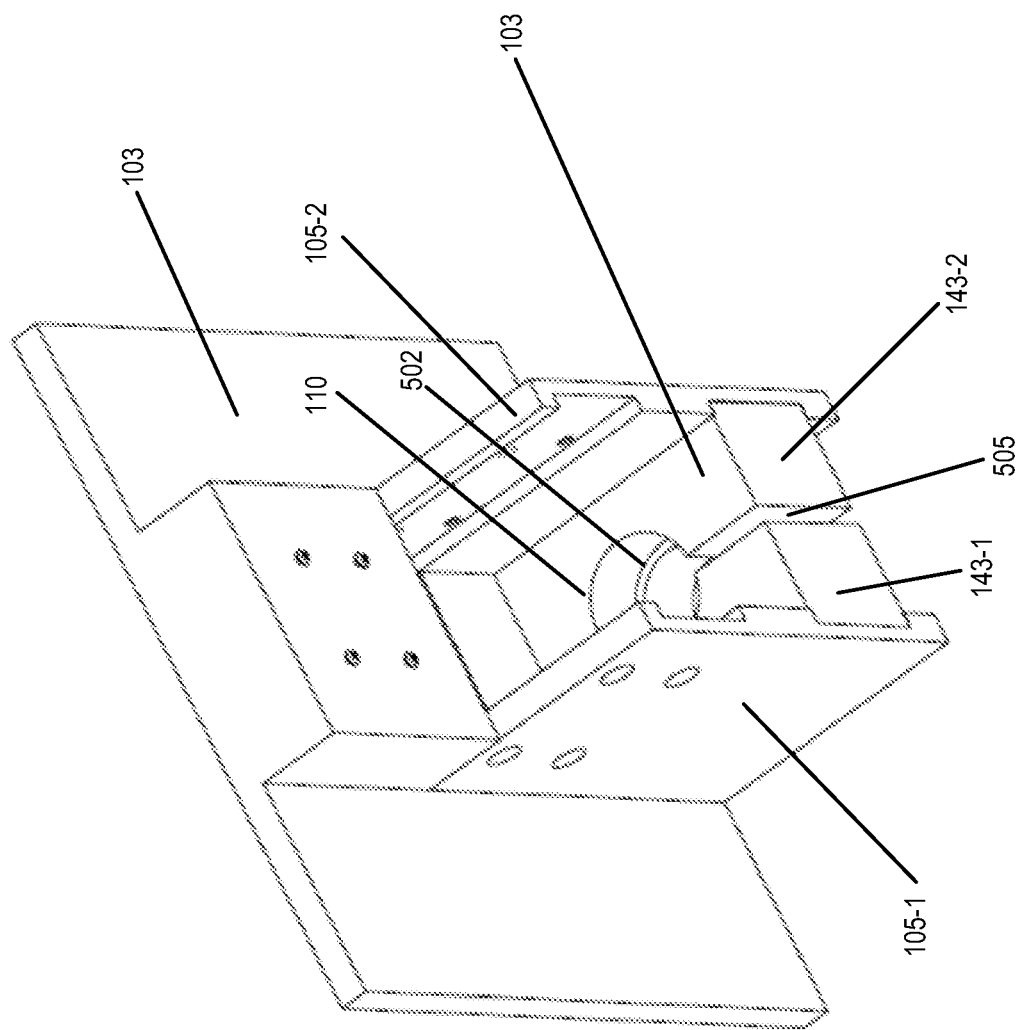
FIG. 6 is a diagram illustrating another view of a portion of an exemplary apparatus in which an exemplary embodiment of transducer validation may be implemented.

FIGS. 5A and 5B are diagrams illustrating views of transducer holder 109 and transducer 164. Referring to FIG. 5A, as previously described, transducer holder 109 may include passthrough hole 110 that is configured to receive and secure the transducer under test. As further illustrated, within passthrough hole 110, a seat 502 may be formed upon which transducer 164 may be seated and secured. For example, in the cross-sectional view of transducer holder 109 in FIG. 5B, passthrough hole 110 may include a counterbored configuration having a first bore 510 and a second bore 515. First bore 510 and second bore 515 may be of different diameters and form a seating surface, e.g., seat 502 with respect to a portion of a bottom or second surface of transducer 164. For example, first bore 510 may be configured to accommodate the body of transducer 164, and second bore 515 may be configured to accommodate wire 152 of transducer 164. As such, second bore 515 may have a smaller diameter than first bore 510. As further illustrated, transducer holder 109 may include a passthrough slot 505 that may accommodate wire 152 of transducer 164 when transducer 164 is received and removed or swapped in and out of transducer holder 109. According to various exemplary embodiments, during a validation test, a top or first surface of transducer 164 may be above, flush with, or below, a top surface 520 of transducer holder 109. According to some exemplary embodiments, seat 502 may include an O-ring (not illustrated) or another type of similar element. The O-ring may minimize (e.g., dampen) ringing of transducer 164 after being struck by striker 145 and assist in seating transducer 164 in transducer holder 109. FIG. 6 is a diagram illustrating a top view of a portion of apparatus 100.

According to other exemplary embodiments, passthrough hole 110 may be of a different configuration. For example, depending on the shape, structure, contour, and/or other type of characteristic of transducer 164, passthrough hole 110 may be of a configuration conducive to such characteristic(s) of transducer 164 and enable transducer 164 to be appropriately positioned in transducer holder 109 for the validation process. According to some exemplary embodiments, one or more dimensions of passthrough hole 110 may be configurable using bushings or another type of insertable interface to modify first bore 510 and/or second bore 515 to receive and secure transducers 164 of varying sizes and/or shapes.

As previously mentioned, according to various exemplary implementations, transducers 164 may be received and removed or swapped in and out for testing by a human or use of a device.

Figure 7:
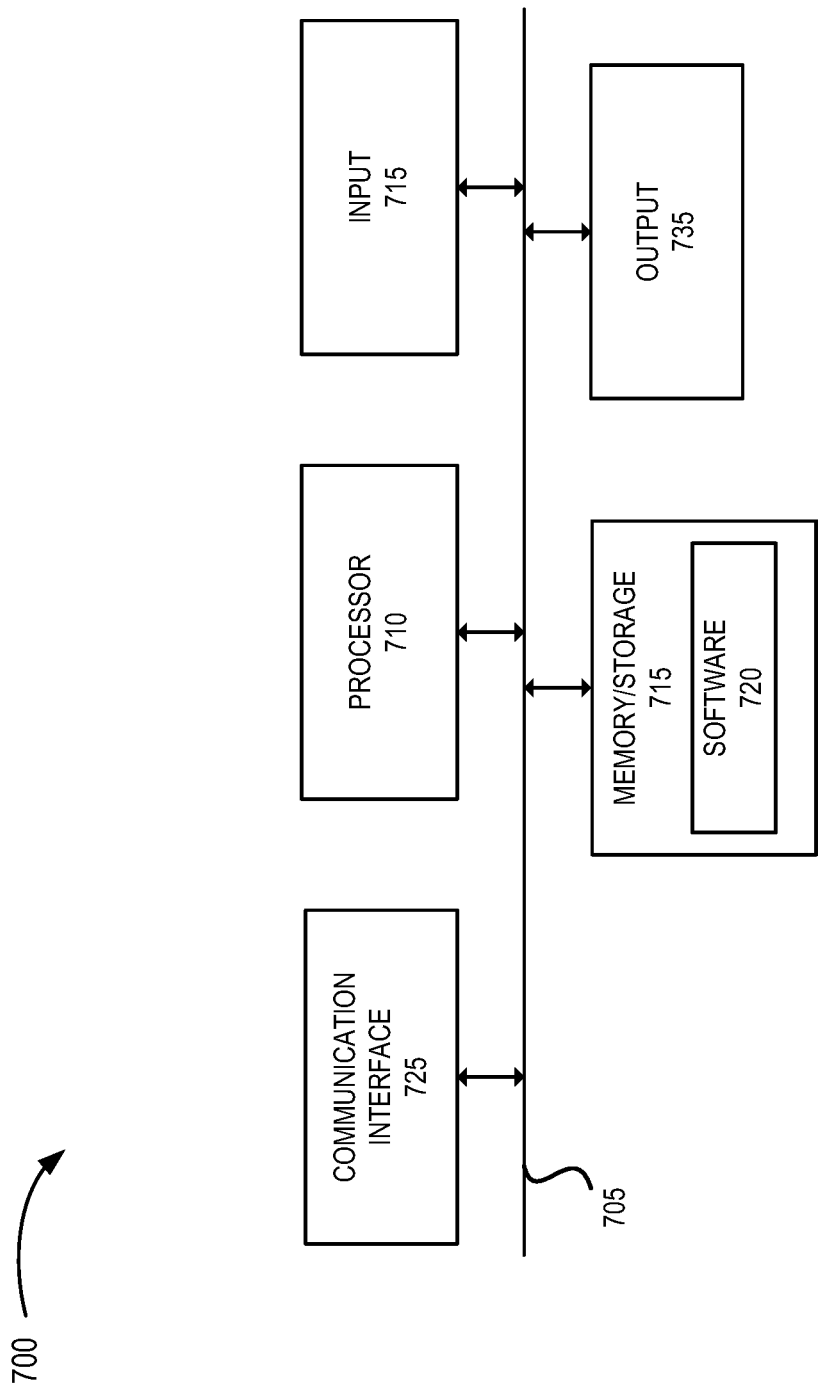
FIG. 7 is a diagram illustrating exemplary components of a device may correspond to a device illustrated and described herein.

FIG. 7 is a diagram illustrating exemplary components of a device 700 that may be included in one or more elements described herein. For example, controller 150 and/or validator 160 may include device 700 or a portion of (e.g., a component) device 700. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation, or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, learning, model-based, etc.

Memory/storage 715 includes one or multiple memories and/or one or multiple other types of storage mediums. For example, memory/storage 715 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 715 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium.

Memory/storage 715 may include drives for reading from and writing to the storage medium. Memory/storage 715 may be external to and/or removable from device 700, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. As an example, with reference to controller 150, software 720 may include an application that, when executed by processor 710, provides a function and/or a process for the management of striker 145, as described herein. According to another example, with reference to validator 160, software 720 may include an application that, when executed by processor 710, provides a function and/or a process pertaining to measurement and analysis of signals output from transducer 164. Software 720 may also include firmware, middleware, microcode, hardware description language (HDL), and/or other form of instruction. Software 720 may also be virtualized. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and/or a communication standard. Communication interface 725 may include various processing logic or circuitry (e.g., multiplexing/de-multiplexing, filtering, amplifying, converting, error correction, application programming interface (API), etc.).

Input 730 permits an input into device 700. For example, input 730 may include a keyboard, a mouse, a display, a touchscreen, a touchless screen, a button, a switch, an input port, speech recognition logic, and/or some other type of visual, auditory, tactile, etc., input component. Output 735 permits an output from device 700. For example, output 735 may include a speaker, a display, a touchscreen, a touchless screen, a light, an output port, and/or some other type of visual, auditory, tactile, etc., output component.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a function or a process described herein. Alternatively, for example, according to other implementations, device 700 performs a function or a process described herein based on the execution of hardware (processor 710, etc.).

Figure 8:
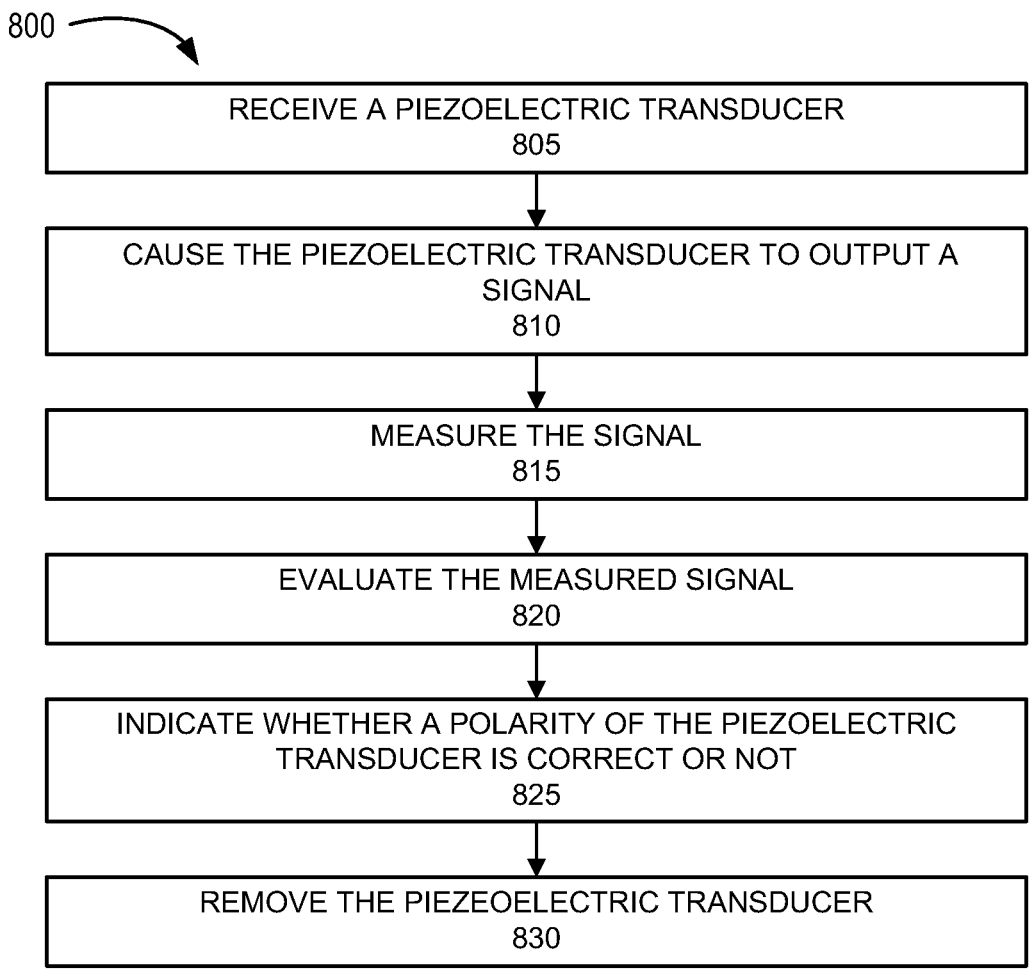
FIG. 8 is a flow diagram illustrating an exemplary process of an exemplary embodiment of transducer validation.

FIG. 8 is a flow diagram illustrating an exemplary process 800 of an exemplary embodiment of the validation process.

According to an exemplary embodiment, apparatus 100 or system 300 may perform, in whole or in part, steps of process 800. According to an exemplary implementation, controller 150, validator 160, and/or transducer manager 170 may execute software to perform a step illustrated in FIG. 8 and described herein. Alternatively, a step illustrated in FIG. 8 and described herein, may be performed by execution of only hardware.

Referring to FIG. 8, in block 805, a piezoelectric transducer is received. For example, transducer holder 109 may receive transducer 164 to be tested. Depending on the scenario, this may be part of a first placement process, in which transducer holder 109 does not have a transducer 164. For example, this may occur when a first-to-be-tested transducer 164 is received. Alternatively, when multiple transducers 164 are to be tested, this may be part of a swap-in and swap-out process, in which a user and/or transducer manager 170 has retrieved a tested transducer 164 from transducer holder 109 after having struck transducer 164, and a new transducer 164 is to be received. In this regard, according to various exemplary implementations, transducers 164 may be received (and removed) or swapped in and out for testing by a human or used by transducer manager 170.

According to an exemplary embodiment, a striking surface of striker 145 may be in a position that is in a space between guide piece 107 and transducer holder 109. For example, as previously mentioned, spacing portion 127-2 may afford sufficient space between a bottom surface of guide piece 107 and a top surface of transducer holder 109 to allow transducers 164 to be received and removed or swapped in and out for testing. According to an exemplary embodiment, wire 152 of transducer 164 may be connected to validator 160 by a user and/or transducer manager 170.

In block 810, the piezoelectric transducer is impulsively stimulated (e.g., struck) to cause an output of a signal. For example, with transducer 164 retained in transducer holder 109, striker 145 may impact transducer 164 and cause an output signal to be generated by transducer 164. According to various exemplary embodiments, depending on the extent of automation (e.g., fully or partially) or not (e.g., wholly performed by a user), this step may be initiated based on communication between elements of system 300, such as validator 160, transducer manager 170, and/or controller 150, as described herein. For example, the communication may include a message indicating that that transducer 164 is ready to be stimulated. Additionally, striker 145 may be moved from a position that placed or allowed transducer 164 to be seated in transducer holder 109 to another position from which striker 145 may initiate hitting transducer 164.

In block 815, the signal is measured. For example, validator 160 may receive the output signal generated by transducer 164 via connector 155. Validator 160 may measure the received signal over a certain duration of time.

In block 820, one or more characteristics of the measured signal is evaluated. For example, validator 160 may analyze the measured signal based on a reference voltage, as described herein. For example, validator 160 may determine a first peak of the measured signal and its polarity (e.g., positive or negative), as described herein.

In block 825, an indication whether the polarity of the piezoelectric transducer is correct or not is provided. For example, validator 160 may determine whether transducer 164 is correctly poled/wire connected or not based on the first peak information. Validator 160 may provide a result of the test that indicates that transducer 164 is correctly poled/wired connected or not. For example, the result may be displayed, data may be written and stored, and/or other types of outputs may be provided to indicate the result. According to some implementations, an identifier of transducer 164 may be correlated to the result. According to some exemplary embodiments, validator 160 may communicate with other elements (e.g., transducer manager 170 and/or controller 150) and/or a user in response to determining a result. The communication may trigger the removal of transducer 164.

In block 830, the piezoelectric transducer is removed. For example, transducer manager 170 or the user may disconnect transducer 164 from validator 160. Controller 150 may position transducer 164 for removal by transducer manager 170 or the user.

FIG. 8 illustrates an exemplary process 800 of the validation process, however, according to other embodiments, process 800 may include additional operations, fewer operations, and/or different operations than those illustrated in FIG. 8 and described herein. Process 800 may be iteratively performed in a fully automated or semi-automated manner, for example.

Figure 9:
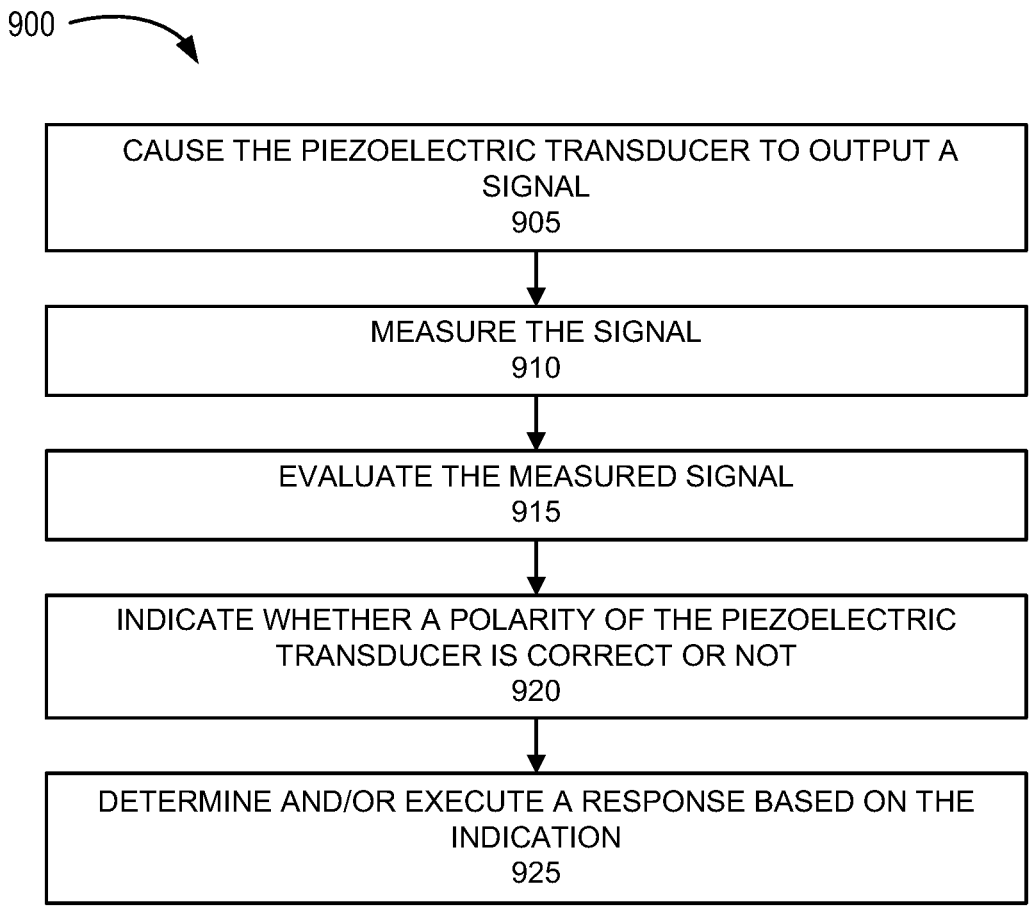
FIG. 9 is a flow diagram illustrating another exemplary process of an exemplary embodiment of transducer validation.

FIG. 9 is a flow diagram illustrating another exemplary process 900 of an exemplary embodiment of the validation process. According to an exemplary embodiment, apparatus 100 or system 300 may perform, in whole or in part, steps of process 900. According to an exemplary implementation, controller 150, validator 160, and/or transducer manager 170 may execute software to perform a step illustrated in FIG. 9 and described herein. Alternatively, a step illustrated in FIG. 9 and described herein, may be performed by execution of only hardware.

Referring to FIG. 9, in block 905, the piezoelectric transducer is stimulated to cause an output of a signal. For example, transducer 164 may be physically excited in a manner that causes transducer 164 to output a signal. According to some exemplary embodiments, transducer 164 may be assembled with other elements of a device like in a flow meter, where a transmitting transducer is connected to a generator (e.g., a pulse generator) and the receiving transducer is connected to measure the time-of-flight data that is converted to volume flow. According to other exemplary embodiments, transducer 164 may be an isolated element where it can be used to detect flaws in solids, levels in liquids, create water mist for therapeutics and provide medical imaging as an echo generator, for example.

In block 910, the signal is measured. For example, validator 160 may receive the output signal generated by transducer 164 via connector 155. Validator 160 may measure the received signal over a certain duration of time.

In block 915, one or multiple characteristics of the measured signal is evaluated. For example, validator 160 may analyze the measured signal based on a reference voltage, as described herein. For example, validator 160 may determine a first peak of the measured signal and its polarity (e.g., positive or negative), as described herein.

In block 920, an indication whether the polarity of the piezoelectric transducer is correct or not is provided. For example, validator 160 may determine whether the transducer 164 is correctly poled/wire connected or not based on the first peak information. Validator 160 may provide a result of the test that indicates that transducer 164 is correctly poled/wire connected or not. For example, the result may be displayed, data may be written and stored, and/or other types of outputs may be provided to indicate the result. According to some implementations, an identifier of transducer 164 may be correlated to the result. According to some exemplary embodiments, validator 160 may communicate with other elements (e.g., transducer manager 170 and/or controller 150) and/or a user in response to determining a result.

In block 925, a response based on the indication is determined and/or executed. For example, when the polarity of transducer 164 is correct, validator 160 or another device may determine transducer 164 is validated for assembly or use in a device. For example, the device may be a water meter. Alternatively, for example, when the polarity of transducer 164 is incorrect, validator 160 or another device, which may receive the result of the determination, may determine whether to use transducer 164 or not. According to an exemplary implementation, even when the polarity of transducer 164 is incorrect, transducer 164 may be used. A reverse poled/connected transducer in a water meter will record a time-of-flight offset (e.g., illustrated in FIG. 4A) that will affect the calculated flow volume. In that case for example, logic of the water meter may be modified in a manner that accounts for the reverse-poled transducer time-of-flight offset. This method holds good in any application where there is an offset in time-of-flight in a transmit-receive measurement.

FIG. 9 illustrates an exemplary process 900 of the validation process, however, according to other embodiments, process 900 may include additional operations, fewer operations, and/or different operations than those illustrated in FIG. 9 and described herein. For example, process 900 may include a step similar to that described in block 805 of process 800. Process 900 may be iteratively performed in a fully automated or semi-automated manner, for example.

As set forth in this description and illustrated by the drawings, reference is made to "an exemplary embodiment," "an embodiment," "embodiments," etc., which may include a particular feature, structure, or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

According to some exemplary embodiments, the antenna assembly detection service may be used in combination (e.g., parallel, in series) with other antenna detection approaches. For example, reference is made to pending provisional patent applications that describe antenna detection based on noise measurement and return loss (e.g., reflected power and forward power).

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 710) of a device. A non-transitory storage medium includes one or more of the storage mediums described in relation to memory/storage 715. The non-transitory computer-readable storage medium may be implemented in a centralized, distributed, or logical division that may include a single physical memory device or multiple physical memory devices spread across one or multiple network devices.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A device comprising:
   a frame;
   a striker;

a guide piece that includes a passthrough hole configured for the striker;

a transducer holder that is configured to position a piezoelectric transducer for test, wherein the transducer holder, which is positioned beneath the guide piece, exposes a first side of the piezoelectric transducer and a second side of the piezoelectric transducer; and a first controller configured to:
analyze an output signal of the piezoelectric transducer caused by the striker traveling via the passthrough hole and hitting the first side of the piezoelectric transducer; and
determine, based on the analysis, whether a polarity of the piezoelectric transducer is correct or not.

2. The device of claim 1, wherein the transducer holder includes a counterbore configuration that includes a first bore that exposes the first side of the piezoelectric transducer and a second bore that exposes the second side of the piezoelectric transducer, wherein the first bore has a larger diameter than the second bore.

3. The device of claim 2, wherein the transducer holder includes a passthrough slot that is configured to receive a wire of the piezoelectric transducer, wherein the passthrough slot is connected to the first bore and the second bore.

4. The device of claim 2, wherein the second bore exposes a wire of the piezoelectric transducer, and the first controller is configured to connect to the wire of the piezoelectric transducer.

5. The device of claim 1, wherein, when determining, the first controller is further configured to:
determine a first peak of the output signal based on a reference voltage; and
determine whether the first peak is a positive voltage or a negative voltage.

6. The device of claim 5, wherein the first controller is further configured to:
determine that the polarity of the piezoelectric transducer is incorrect when the first peak is a negative voltage; and
determine that the polarity of the piezoelectric transducer is correct when the first peak is a positive voltage.

7. The device of claim 1, further comprising:
a second controller configured to:
cause the striker to hit the first side of the piezoelectric transducer; and
retrieve the striker after the first side of the piezoelectric transducer is hit.

8. The device of claim 1, wherein the frame includes a first track configured to receive the guide piece and a second track configured to receive the transducer holder.

9. A device comprising:
a frame;
a generator configured to generate an impulse sufficient to excite a piezoelectric transducer under test;
a transducer holder that is configured to position the piezoelectric transducer, wherein the transducer holder exposes a first side of the piezoelectric transducer and a second side of the piezoelectric transducer; and
a first controller configured to:
analyze an output signal of the piezoelectric transducer caused by the generator; and
determine, based on the analysis, whether a polarity of the piezoelectric transducer is correct or not.

10. The device of claim 9, wherein the transducer holder includes a counterbore configuration that includes a first bore that exposes the first side of the piezoelectric transducer and a second bore that exposes the second side of the piezoelectric transducer, wherein the first bore has a larger diameter than the second bore.

11. The device of claim 10, wherein the transducer holder includes a passthrough slot that is configured to receive a wire of the piezoelectric transducer, wherein the passthrough slot is connected to the first bore and the second bore.

12. The device of claim 9, wherein the impulse is an ultrasonic pulse.

13. The device of claim 9, wherein, when determining, the first controller is further configured to:
determine a first peak of the output signal based on a reference voltage; and
determine whether the first peak is a positive voltage or a negative voltage.

14. The device of claim 9, wherein the frame comprises:
a first panel; and
a second panel, wherein the first panel and the second panel are parallel to each other and are perpendicular to a base panel, and wherein the first panel and the second panel each includes a track that is configured to receive the transducer holder.

15. The device of claim 14, wherein the tracks of the first panel and the second panel allow the transducer holder to slide towards and slide away from the base panel.

16. A method comprising:
causing a piezoelectric transducer to emit a signal;
evaluating the signal based on a reference voltage;
determining, based on the evaluating, whether the piezoelectric transducer is reverse-poled or not; and
outputting a result of the determining, wherein the result indicates that the piezoelectric transducer is reverse-poled or that the piezoelectric transducer is correctly poled.

17. The method of claim 16, further comprising:
determining to modify a first device that includes the piezoelectric transducer or to modify a second device that the piezoelectric transducer is to be included when the result indicates that a polarity of the piezoelectric transducer is not correct.

18. The method of claim 17, wherein the first device or the second device is a water meter.

19. The method of claim 17, wherein software or firmware of the first device or the second device is modified.

20. The method of claim 16, wherein the evaluating comprises:
determining a first peak of the signal based on the reference voltage; and
determining whether the first peak is a positive voltage or a negative voltage.

21. A non-transitory computer-readable storage medium storing instructions executable by a processor of a device, which when executed cause the processor to:
cause a piezoelectric transducer to emit a signal;
evaluate the signal based on a reference voltage;
determine, based on the evaluation, whether a polarity of the piezoelectric transducer is correct or not; and
output a result of the determination, wherein the result indicates that the polarity of the piezoelectric transducer is correct or not.

* * * * *